United States Patent Office 3,744,999
Patented July 10, 1973

3,744,999
COMPOSITE FERROPHOSPHORUS
COMPOSITION
Milton J. Scott, St. Louis, Harry M. Stevens, Ballwin, and Hans-Jurgen A. Stenzel, Brentwood, Mo., assignors to Monsanto Company, St. Louis, Mo.
No Drawing. Filed Mar. 10, 1970, Ser. No. 18,317
Int. Cl. C21c 7/00; C22b 9/08; C22c 33/00
U.S. Cl. 75—132                                        10 Claims

ABSTRACT OF THE DISCLOSURE

Ferrophosphorus containing at least 1% silicon by weight is admixed with an oxidizing agent and formed into an integral composite, the silicon content of which is converted to silica upon addition of the composite to molten iron, steel, or alloys thereof. The composite provides a useful effective low silicon source of phosphorus for iron, steel and their alloys.

BACKGROUND OF THE INVENTION

This invention relates to a composite composition of ferrophosphorus suitable for use in the steel industry in the formation of phosphorus containing steels.

Ferrophosphorus is a by-product of the well-known electric furnace processes for production of elemental phosphorus. Depending upon the compositions of ore fed to the furnace, the ferrophosphorus generally consists of 20% to 30% phosphorus, from 55% to 80% iron and, in some instances, minor amounts of chromium, vanadium, titanium manganese and nickel, etc. In addition, ferrophoshorus, particularly that derived as a by-product of the processing of phosphorus ores from the southeastern part of the United States, often contains silicon in amounts up to 8%.

The addition of ferrophosphorus to molten iron, steel, and alloys thereof is a convenient means of incorporating desired phosphorus contents into steel alloys. However, since silicon (or ferro-silicon) is soluble in molten metals and affects their properties, it is often desired that the ferrophosphorus used for such purpose has a silicon content less than 1% by weight, preferably less than .5% by weight or less. Accordingly, for such use, it has hitherto been necessary to select ferrophosphorus characterized by low silicon content as a result of the assay of the raw materials fed to the phosphorus furnace. Alternatively, ferrophosphorus having high silicon content can be processed to remove the silicon or convert the silicon to innocuous silica (which is insoluble in the molten metal). Unfortunately, such "disiliconization" treatments have hitherto proven undesirably expensive.

SUMMARY OF THE INVENTION

It is the object of this invention to provide a composite composition containing high silicon content ferrophosphorus which can be added to steel formulations without unduly increasing the silicon content thereof.

Basically, the compositions of this invention comprise particulate ferrophosphorus less than 4 mesh U.S. standard sieve size having an elemental silicon content of at least 1.0% by weight, admixed and in adherent contact with a quantity of solid oxidizing agent sufficient to convert a major proportion of the silicon to silica. In one embodiment of the invention, such composition is provided as a shaped, integral form particularly convenient for use in metallurgical industries.

The invention will be better understood from the following description of the preferred embodiments.

DESCRIPTION OF THE PREFERRED EMBODIMENTS

As previously set forth, the composition of this invention comprises ferrophosphorus containing silicon (probably present as ferro-silicon) and a solid oxidizing agent. It would normally be expected that upon addition of such a compoistion to molten iron, steel or their alloys that the silicon, iron, and phosphorus contained in the composition would immediately dissolve in the melt and thus be separated from the oxidizing agent before any substantial conversion of silicon to silica takes place. However, when the compoistions of this invention are added to molten steel or steel alloy, it is unexpectedly found that the silicon content of the composition is substantially completely oxidized to silica. In order to obtain this surprising and advantageous result, it is essential that the composition possess certain critical characteristics as hereinafter discussed.

The ferrophosphorus contained in the composition must be less than 4 mesh U.S. standard sieve size, preferably less than 30 mesh or even smaller. If larger particles of ferrophosphorus are utilized, the conversion of the silicon content of the ferrophosphorus to silica upon addition of the composition to molten steel or steel alloy is low even when excess oxidizer is employed. The ferrophosphorus utilized in the invention will contain at least 1% by weight silicon and generally substantially larger amounts up to 8% it being emphasized, however, that there is no theoretical upper limit on the silicon content.

Any oxidizing agent which is solid at ambient temperature and a thermally stable liquid at the temperature of the molten iron, steel or alloy to which the composition of this invention is to be added and which has an oxidation potential sufficient to oxidize silicon to silica at the temperature of the melt can be utilized in the practice of the invention. For convenience, such oxidizing agents are hereinafter designated as solid oxidizing agents. The use of alkali metal or alkaline earth metal phosphates such as $Na_2HPO_4$, $Na_4P_2O_7$, $NaH_2PO_4$, $NaPO_3$, $Ca_3(PO_4)_2$, $CaHPO_4$, $Ca(H_2PO_4)_2$, $Ca_2P_2O_7$ $Ca(PO_3)_2$, $[Ca_3(PO_4)_2]_3CaF_2$, or mixtures thereof as solid oxidizing agents is particularly preferred since these materials provide an additional source of phosphorus. Other solid oxidizing agents which can be employed include by way of example $Na_2CO_3$, $NaOH$, metal oxides such as $Fe_2O_3$, $Mn_3O_4$, and $Cr_2O_3$. When needed, flux such as $CaF_2$ or $CaO$ can be employed. Obviously, the choice of the particular oxidizing agent will be governed by considerations such as availability, cost, and effect of oxidizing agent components on particular iron or steel alloys.

The amounts of solid oxidizer which must be composited with the ferrophosphorus to convert the desired amount of silicon to silica is readily determined by routine testing. When the ferrophosphorus is finely divided (<40 mesh), the actual oxidizer requirements approach stoichiometric requirements. When the ferrophosphorus is coarses, excess oxidizer is required. The use of finely divided ferrophosphorus to avoid necessity of wasteful oxidizer excesses is preferred.

It is essential that the ferrophosphorus and solid oxidizing agent be thoroughly admixed and composited so that upon addition to a molten metal bath, the oxidizing agent will remain in integral contact with the ferrophosphorus for a length of time sufficient to effect oxidization of the silicon contained therein.

Integral compositing can be conveniently obtained by admixing the particulate ferrophosphorus with oxidizing agent and dampening the mixture so that the oxidizing agent adheres to the ferrophosphorus particles. The composite is then dried, leaving the oxidizing agent in adherent contact with the ferrophosphorus particles. In drying, it is desirable to use conditions adequate to remove both free water and any water of hydration in order that undue rapid disintegration of the composite does not take place upon its addition to molten metal.

Alternatively, integral compositing can be effected by pelletizing or briqueting mixtures of ferrophosphorus and oxidizing agent in accordance with conventional procedures. If desired, the mixture can be dampened to facilitate the pelletizing or briqueting operation in which case a subsequent drying step is required. Conversion of the compositions of this invention into pellets, briquets, or other shaped forms is particularly desirable for convenience in handling.

The compositions of this invention and their use are further illustrated by the following examples wherein all parts and percentages are by weight.

Example I

A shaped composite composition is prepared as follows:

About 108 parts $Ca(H_2PO_4)_2 \cdot H_2O$ (less than 20 mesh U.S. standard sieve size) is admixed with about 1570 parts ferrophosphorus (assaying about 22.5% p; about 3.4% Si and being less than 100 mesh U.S. standard sieve size). These proportions corresponds to theoretical requirements for conversion of the Si to $SiO_2$. About 80 parts water is added gradually with mixing. The damp mixture is compressed at about 5000 p.s.i.g. into cylindrical pellets about 1 inch in diameter and about ¾ inch long. These pellets are dried at 150° C. for 3 hours and have a dry weight of about 42 grams each.

The pellets are added to molten steel which is then analyzed to determine increase in phosphorus and increase in silicon. The ratio $$\frac{\text{increase in phosphorus content}}{\text{increase in silicon content}}$$

is about 67.2 as compared to a phosphorus/silicon ratio in the ferrophosphorus contained in the pellets of about 6.6. Thus it is seen that a substantial portion of the silicon is converted to silica and that the pellets can be considered as having a very low effective silicon content. (Conversion of the phosphate salt to elemental phosphorus also serves to provide additional phosphorus for the steel.)

Example II

The procedure of Example I is repeated with the exception that the ferrophosphorus utilized is less than 20 mesh, greater than 100 mesh U.S. standard sieve size. The ratio $$\frac{\text{increase in phosphorus content}}{\text{increase in silicon content}}$$

of the steel melt is about 16.5.

Example III

The procedure of Example II is repated with the exception that 2.5 times the amount of $Ca(H_2PO_4) \cdot H_2O$ theoretically required for conversion of Si to $SiO_2$ is utilized.

The ratio $$\frac{\text{increase in phosphorus content}}{\text{increase in silicon content}}$$

of the steel melt is about 2600.

Example IV

Briquets are prepared by molding a mixture of 100 parts ferrophosphorus (less than 100 mesh U.S. standard sieve size) and 13 parts $Ca(H_2PO_4)_2 \cdot H_2O$ (less than 20 mesh U.S. standard sieve size) dampered with 10 parts water and drying at 150° C. for 8 hours. The briquets possess excellent physical strength and exhibit an effective low silicon content when added to molten steel.

What is claimed is:

1. A composite composition containing high silicon content ferrophosphorus suitable for rephosphorizing steel without unduly increasing the silicon content of the steel comprising particulate ferrophosphorus and solid oxidizing agent, said particulate ferrophosphorus being less than 4 mesh U.S. standard sieve size and having an elemental silicon content of at least 1.0% by weight, said ferrophosphorus being admixed and in adherent contact with sufficient of said solid oxidizing agent to convert at least a major proportion of the said silicon to silica.

2. The composition of claim 1 wherein said ferrophosphorus is less than 30 mesh U.S. standard sieve size and said composition contains an amount of said oxidizing agent sufficient to convert substantially all of said silicon to silica.

3. The composition of claim 2 wherein said oxidizing agent is a phosphate salt.

4. The composition of claim 3 wherein said phosphate salt is $Ca(H_2PO_4)_2$.

5. A composite composition having a shaped, integral form containing high silicon content ferrophosphorus suitable for rephosphorizing steel without unduly increasing the silicon content of the steel comprising particulate ferrophosphorus and solid oxidizing agent, said particulate ferrophosphorus being less than 4 mesh U.S. standard sieve size and having an elemental silicon content of at least 1.0 percent by weight, substantially uniformly admixed and with sufficient solid oxidizing agent to convert at least a major proportion of said silicon to silica.

6. The composition of claim 5 wherein said ferrophosphorus is less than 30 mesh U.S. standard sieve size and said composition contains an amount of said oxidizing agent sufficient to convert substantially all of said silicon to silica.

7. The composition of claim 5 wherein said oxidizing agent is a phosphate salt.

8. The composition of claim 7 wherein said phosphate salt is $Ca(H_2PO_4)_2$.

9. A composition of claim 3 wherein said oxidizing agent is selected from the group consisting of alkali metal and alkaline earth metal phosphates.

10. A composition of claim 7 wherein said oxidizing agent is is selected from the group consisting of alkali metal and alkaline earth metal phosphates.

References Cited

UNITED STATES PATENTS

| | | | |
|---|---|---|---|
| 1,655,981 | 1/1928 | Barr | 23—223 |
| 3,323,864 | 6/1967 | Lapple | 23—110 R |
| 1,882,517 | 10/1932 | Neumark | 75—132 |
| 1,751,783 | 3/1930 | White | 75—132 |
| 2,208,974 | 7/1940 | Haglund | 75—56 |
| 2,390,346 | 12/1945 | Bayer | 75—60 |
| 2,767,077 | 10/1956 | Perrin | 75—56 |
| 2,793,110 | 5/1957 | Kosmider | 75—60 |
| 3,343,909 | 9/1967 | Kim | 75—6 |
| 3,382,063 | 5/1968 | Imperato | 75—3 |

L. DEWAYNE RUTLEDGE, Primary Examiner

P. D. ROSENBERG, Assistant Examiner

U.S. Cl. X.R.

75—56, 93; 423—305